1,568,057

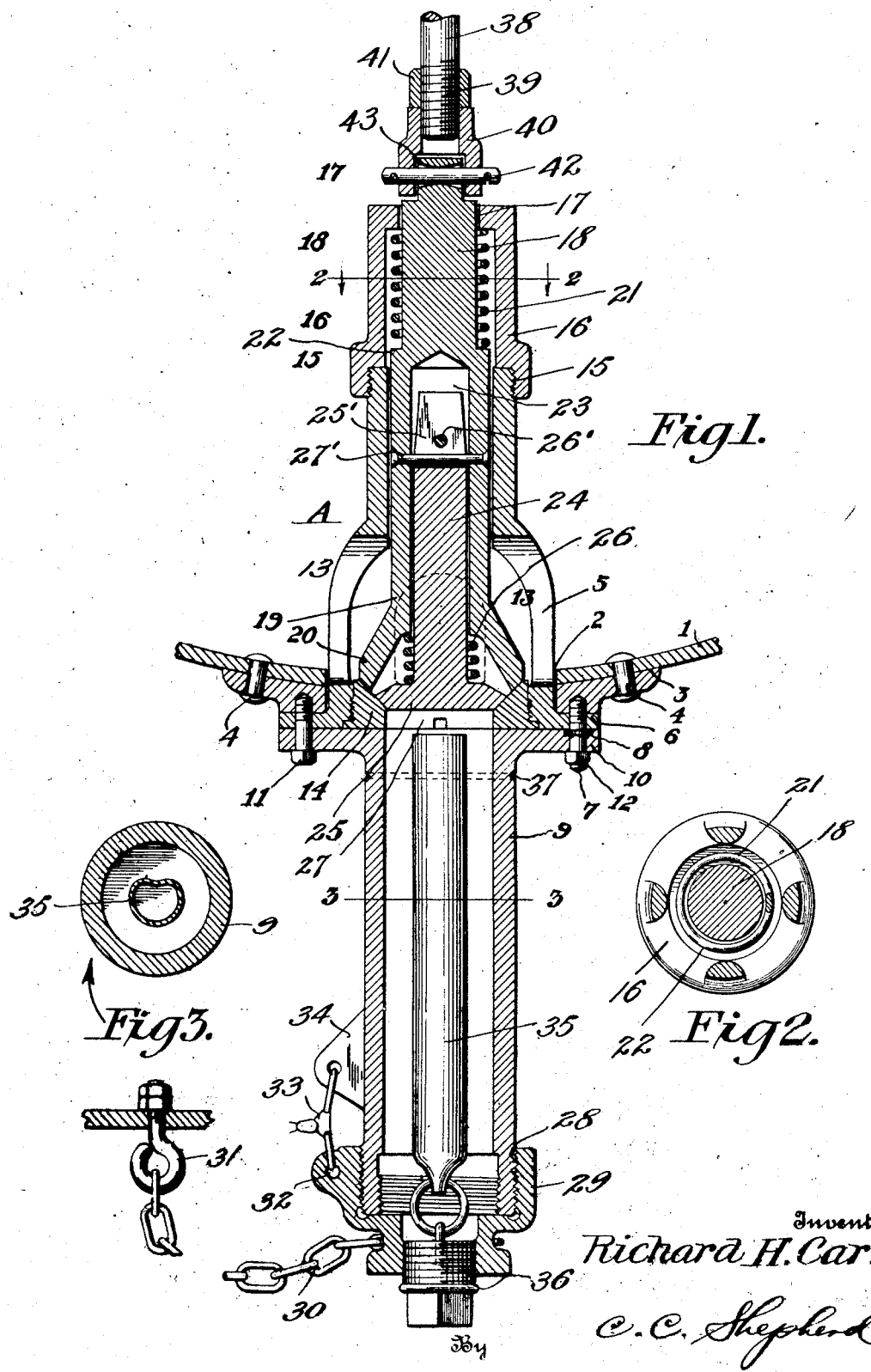

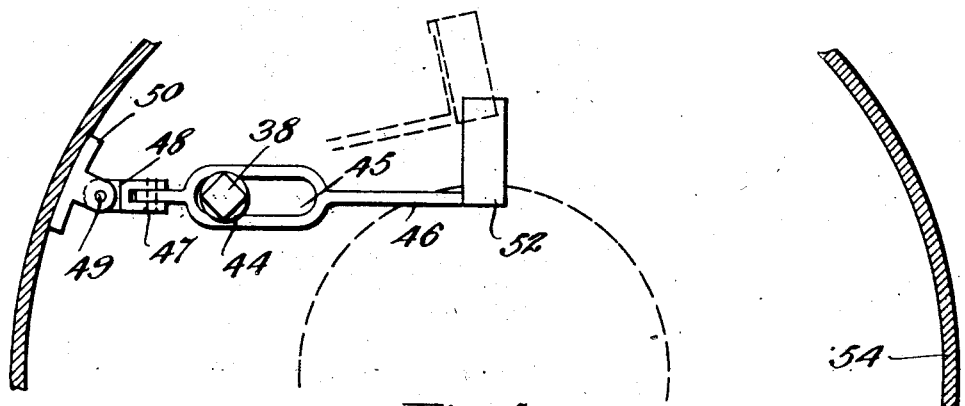
Fig. 4
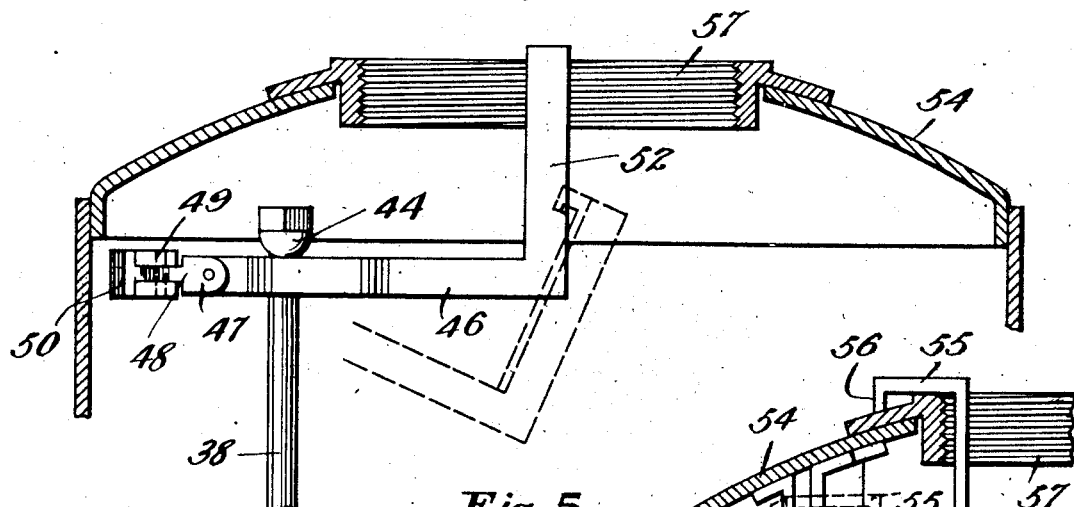
Fig. 5
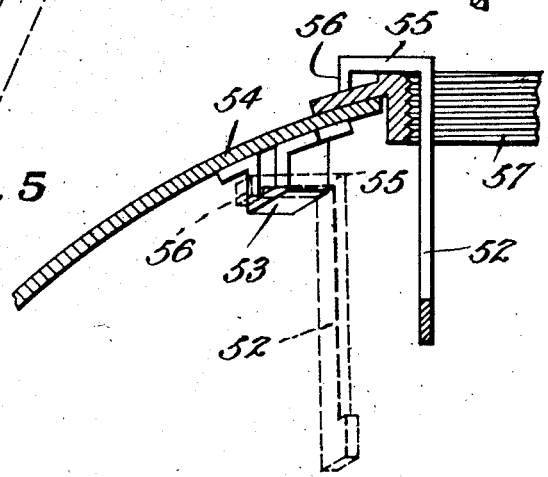
Fig. 6
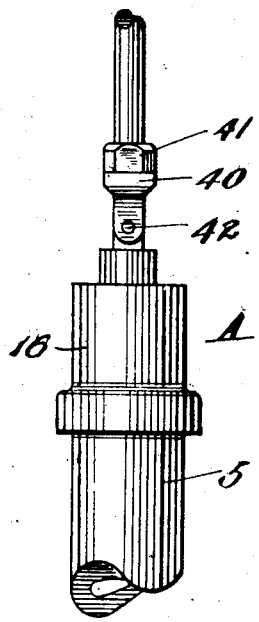
Inventor
Richard H. Carr
By C. C. Shepherd,
Attorney Patented Jan. 5, 1926.

UNITED STATES PATENT OFFICE.

RICHARD H. CARR, OF COLUMBUS, OHIO, ASSIGNOR TO THE PURE OIL COMPANY, OF COLUMBUS, OHIO, A CORPORATION OF OHIO.

OUTLET STRUCTURE FOR OIL CONTAINERS.

Application filed June 23, 1920, Serial No. 391,202. Renewed November 4, 1925.

*To all whom it may concern:*

Be it known that RICHARD H. CARR, a citizen of the United States, residing at Columbus, in the county of Franklin and State of Ohio, has invented certain new and useful Improvements in Outlet Structures for Oil Containers, of which the following is a specification.

This invention relates to improvements in valves, and has particular reference to an improved type of valve adapted to be specifically employed in connection with oil containers such, for example, as tank cars of the type employed in effecting the transportation of fluid hydro-carbons, the object of the invention being fundamentally to provide a valve which will be efficient in operation, substantial in construction and capable of imparting extended service with but a minimum of repair and replacement of parts.

In the operation of tank cars, considerable difficulty has been encountered in providing a valve capable of preventing leakage of the contents of the cars. This has been due to many causes, some of which may be attributed to water collecting in and around the parts of the valve and then freezing, thereby fracturing fragile portions of the valve or causing the latter to leak and to become generally inefficient; again, it is imperative that a close seating valve be provided and one of positive operation in order to prevent undue fluid seepage through the valve, and finally careless operation of the valves is a frequent cause for undue loss of the fluid contained within the cars.

Therefore, the present invention has for its primary object to provide a type of valve wherein mechanism is provided for overcoming the above mentioned disabilities, and others, and wherein the mechanism is of such construction as to provide a valve capable of firmly and positively seating, and cooperative means for preventing the freezing of water within the valve from injuring parts of the latter, to provide means for indicating when fluid has been withdrawn from the car through the valve, and in the provision of actuating means for operating the valve, said means being of such construction that the same will serve to clearly indicate the various positions of operation on the part of the valve.

With these and other objects in view, as will appear as the description proceeds, the invention accordingly consists in the novel features of construction, combinations of elements and arrangements of parts, hereinafter to be fully described and pointed out in the appended claims.

In the accompanying drawings, forming a part of this specification and in which similar characters of reference denote like and corresponding parts:

Figure 1 is a vertical sectional view taken through the improved valve structure comprising the present invention.

Figure 2 is a horizontal sectional view taken along the line 2—2 of Figure 1.

Figure 3 is a similar view taken along the line 3—3 of Figure 1.

Figure 4 is a plan view disclosing more particularly the operating mechanism for the valve.

Figure 5 is a side elevation of said operating mechanism.

Figure 6 is a detail sectional view disclosing in full lines the position of the operating mechanism when the valve is opened and showing by dotted lines the position of said mechanism when the valve is closed.

Referring more particularly to the drawings, the numeral 1 designates the body of a tank car. It will be understood, however, that the invention is not limited in its application solely to its use in conjunction with traveling carriers, but is adapted for all kinds of fluid containers which are subject to more or less severe use and adverse climatic conditions. Since, however, the principles of the invention and the adaptation of the latter are so admirably clear when used in connection with the tank car, the following description will be accordingly directed to containers of this nature.

In this instance, the bottom of the tank 1 is formed with an opening 2 in which is vertically mounted the improved valve structure A comprising the present invention. Concentrically surrounding the opening 2 is a collar 3, which is riveted or otherwise secured as at 4 to the lower portion of the tank 1. Arranged to be secured to this collar is a valve cage 5, the latter being disposed vertically within the tank and has its lower end formed to provide an outturned flange 6 which is disposed to lie contiguous to the collar 3. As shown in Figure 1, the connection between the collar and cage is effected by the provision of a plurality of retaining bolts 7. As shown, these bolts have their upper ends threaded into openings provided in the collar 3, and said bolts are further formed with flanges 8 which are arranged to engage with the under surfaces of the flange 6. Obviously, by threading the bolts 7 into the openings provided therefor in the collar 3, said bolts will be positioned so that their flanges 8 will bind the flange 6 of the cage member in secured relationship with the collar 3. The casing of the valve further comprises an exterior conduit 9 which is formed from any suitable material and is of hollow cylindrical construction. The upper end of the conduit terminates in the outwardly extending flange 10, which is adapted to lie in engagement with and immediately below the flange 6. Bolts 11 are arranged to pass through registering openings formed in the cooperative flanges 6 and 10 and are threaded into openings provided in the bottom of the collar 3, whereby by virtue of this construction the said bolts 11 will operate to securely bind and connect the conduit in rigid association with the cage and collar members. In conjunction with the bolts 11, the conduit 9 is further supported by extending the shanks of the bolts 7 so that the latter will pass through openings provided therefor in the flange 10, these lower ends of the bolts 7 are equipped with nuts 12 which are adapted to be threaded into engagement with the under sides of the flange 10, the said bolts 7 therefore act in combination with the bolts 11 to retain the parts of the valve casing in assembled relationship. It will be observed that by the peculiar construction of the bolts 7, the conduit 9 may be removed from connection with the cage member and yet the latter will be retained in secured connection with the collar 3. Thus, in the event of injury to the exterior conduit, substitution of parts may be quickly and easily effected without disturbing the interior parts.

The cage member 5 is of hollow construction and as before stated extends upwardly within the tank 1, the lower end of said cage being provided with a plurality of fluid openings 13 and also with a removable threaded valve seat 14. The upper end of the cage is threaded as at 15 to receive a cap extension 16. This extension is provided with an axial opening 17, in which is slidably mounted the stem 18 of a secondary valve 19. This valve is provided at its lower end with an inverted funnel shaped portion 20 which is normally disposed to rest upon the valve seat 14, a spring 21 being positioned between the upper end of the cap extension 16 and the annular shoulder 22 provided upon the stem 18, said spring normally acting to maintain the portion 20 of the valve 19 in engagement with the seat 14, the spring 21 exerting a pressure of substantially one hundred pounds upon the valve to maintain the latter in its seated position.

The stem 18 is of substantially hollow construction and provides an internal cavity 23 in which is slidably mounted the stem 24 of a main valve 25, the latter being so disposed as to normally engage with the seat 14, substantially after the manner shown in Figure 1. A coil spring or its equivalent 26 is situated between the reduced end of the funnel shaped portion 20 of the secondary valve and the upper surface of the main valve 25, whereby through the instrumentality of the spring 26, the main valve will be pressed into engagement with the seat 14 at substantially a pressure of fifty pounds when the valve is seated. Thus through the construction described it will be manifest that the outlet port 27 formed in the seat member 14 will be normally closed by the main and supplemental valves, and that the latter will positively operate under the influence of spring pressure to maintain the port 27 closed against the effects of undue fluid seepage. The upper end of the valve stem 24 is bifurcated as at 25' and is provided with a transversely located cross pin 26', the secondary valve stem 18 is provided, in turn, with a cross pin 27' located at right angles to the pin 26'. Normally, the pin 27' is positioned at an appreciable distance beneath the pin 26' and, in view of the fact that the mechanism for opening the valve is directly connected with the stem 18, it will be apparent that the secondary valve will be opened prior to the opening of the main valve, since, the secondary valve may be elevated a considerable distance to effect its opening before the pin 27' thereof contacts with the pin 26' carried by the main valve. It will be noted that by virtue of this construction and correlation of the cage and valve construction, freezing of water in any part of the construction can impart no damage to the valve.

The conduit 9 has its lower end provided with threads 28 upon which is threadedly mounted a removable closure 29. This closure is attached by means of a chain 30 to a permanent portion 31 of the tank, a feature which permits the closure to be operated frequently without becoming lost or accidentally misplaced. When the valves 19 and 25 are opened, the closure 29 is removed and the fluid contained within the tank 1 may be permitted to pass off. Preferably, the closure is provided with an apertured ear 32 through which a suitable form of seal 33 is passed, said seal being also attached to an ear 34 formed upon the lower end of the conduit 9. By the provision of the seal 33, surreptitious actuation of the valve may be readily denoted. It frequently occurs that water will collect within the conduit 9, and to prevent this water when frozen from harming the construction, said conduit is provided with an upstanding pipe 35. This pipe is adapted to be formed from a substantially flexible material such, for example, as rubber or lead and is normally positioned so as to extend upright within the conduit. Thus, in case of water freezing in the outlet conduit, the pipe 35 collapses or is partially flattened before the pressure, due to the freezing, permits the cracking of the wall from the conduit 9. The lower end of the pipe is connected with a plug 36 which is removably threaded within the lower portion of the closure 29. By the use of this construction, the pipe 35 may be quickly and readily renewed or replaced in its operative position within the closure. Again, it will be noted that the upper end of the conduit 9 contiguous to the flange 10 is provided with a groove 37. By the provision of this groove the strength of the wall of the conduit is somewhat reduced at this point, whereby in the event of the engagement of the conduit with an extraneous object, the conduit itself only will be broken and the damage therefore will not be transmitted to the interior valve mechanism of the tank.

The operating mechanism for the valve is so formed as to comprise a vertically movable rod 38 which has its lower end threaded as at 39 to receive a yoke 40, the latter being permanently retained in its applied position upon the lower end of the rod by means of a lock nut 41. The yoke itself is provided with a cross pin 42 which passes through a venturi shaped opening 43 provided in the upper end of the secondary valve stem 18. By virtue of this connection it will be observed that the rod 38 will have a substantially universal connection with the upper end of the stem 18. The upper end of the rod 38 is provided with a spherical head 44 which is positioned in correlation with an elongated slot 45 provided in a pivoted actuating lever 46. This lever is of substantially L shaped formation and has its inner horizontal end pivoted horizontally within the spaced ears 47 of a link 48, the link, in turn, being pivotally connected with a vertical pivot 49 carried by a bracket 50 stationarily mounted in any suitable manner within the dome 51 of the tank 1. The vertical leg 52 of the lever is, as shown in dotted lines in Figure 6, normally positioned to engage with a stirrup 53 mounted on the under side of the dome wall 54. This is accomplished by bending the upper end of the leg 52 laterally to provide an extension 55 and then by terminating this extension in a downwardly extending ledge 56, the extension 55 normally lying between the vertical legs of the stirrup 53 and is prevented from moving laterally by reason of the ledge 56. When positioned in engagement with the stirrup 53, the lever 46 will be positioned to permit the main and secondary valves to be retained in closed engagement with the valve seat 14. However, to open the valves, the hand is inserted through the inlet opening 57 provided in the dome 51 so that the vertical leg 52 of the lever may be grasped and lifted out of engagement with the stirrup 53. The lever may then be swung laterally by reason of its connection with the link 48 and the bracket 50 so that when the lateral extension 55 of the lever falls within the confines of the opening 57, the said lever may be elevated to assume the full line position shown in Figure 4. This permits the rod 38 to be elevated, thereby opening the secondary and main valves in the manner heretofore described. The lever may be maintained in its elevated position by simply dropping its lateral extension over the upper edge of the opening 57 whereby the contents of the car may be drained. It will be observed that the slot 45 permits of the raising of the lever 46, and also that the pivoted connection between the lower end of the rod and the upper end of the stem 18 also permits of the movement on the part of the lever 46 without undue binding action. As shown in Figures 5 and 6, the lever engages with the sides of the opening 57 when the valve is opened. Thus, in the event of the operator forgetting to close the valve, it will be impossible to put the dome cover in place, since the vertical leg of the lever offers an obstruction to this operation. This feature prevents the operator from forgetting the positions of the valve.

In view of the foregoing description taken in conjunction with the accompanying drawings, it will be apparent that valve mechanism has been provided of an efficient character for the purpose set forth. By its construction freezing within and around the valve will impart no injury thereto, and the construction also serves to permit the valves to be readily opened and closed in a positive manner regardless of accumulative ice deposit. By virtue of the flared lower portion 20 of the secondary valve, it will be apparent that its contraction thereabout, will cause such ice to slip upwardly away from the seat 14, thus allowing the latter to be freely opened at all times. The double valve construction provides extra seating area and hence serves to reduce fluid seepage to a minimum. Further, by the provision of the reinforced ring construction 3 contortion in the walls of the tank car will not affect the valve structure or cause the latter to become faulty and liable to leak. It will be apparent that by the provision of the bolt construction 7 and 11, the outlet conduit may be readily removed from the car without disturbing the internal valve structure. By removing the outlet conduit the valve seat 14 may be similarly removed, and thus its seat may be ground in a simple and ready manner without causing the operator to enter the tank and to grind the valve seat while operating within the tank. The operating mechanism also permits the valve to be readily opened from a position of advantage and serves to maintain the valve in its upright position without continuous attention. The end 56 of the lever 46 preferably engages directly with the securing flange of the closure 57 and therefore the weight of the lever 46 and associated parts will not bear directly upon the upper lead surface of said closure.

What is claimed is:

1. In a valve of the character described, a cage member rigidly mounted within the bottom of a fluid container, said cage member being formed to include an outlet port through which fluid from said container is drawn off and a cooperative valve seat, a main valve normally disposed in engagement with said seat to obstruct fluid flow through said port, a secondary valve situated above said main valve and disposed in engagement with the same seat, an actuating mechanism connected with said secondary valve, and means whereby said secondary valve will operate to open said main valve after said actuating mechanism has been operated to open the secondary valve.

2. In a valve of the character described, a cage member rigidly mounted in an opening formed in the lower portion of a fluid container, said cage member being formed to include an outlet port through which fluid is adapted to be withdrawn from the container and a cooperative valve seat surrounding said port, a secondary valve having an enlarged lower end arranged to engage with said seat, said secondary valve including an upstanding and substantially hollow stem slidably mounted within said cage member, a spring cooperative with said stem and normally serving to hold the secondary valve in engagement with said seat, a main valve disposed to engage with said seat and situated within the confines of the lower enlarged end of said secondary valve, said main valve being provided with a stem slidably disposed within the hollow stem of the secondary valve, a spring positioned between said secondary valve and said main valve and operating to maintain the latter in engagement normally with said seat, an actuating mechanism for opening said valves connected with the stem of the secondary valve, and means carried by the secondary valve for opening the main valve subsequently to the opening of said secondary valve.

3. In a valve structure of the character described, the combination with a tank car, of a valve structure formed in the lower portion of the tank of said car and normally operating to govern the flow of fluid from said tank, of a manually operated lever pivotally mounted in the dome of said tank, said lever having an elongated slot formed therein, a rod having its lower end pivotally connected with said valve structure and its upper end slidably mounted within said slot, a pivot for said lever carried by the inner wall of said dome, said pivot permitting of lateral and vertical oscillation on the part of said lever, a stirrup carried by said dome and with which said lever is engaged when the valve structure is in a closed position, said dome having an inlet opening formed therein, and means whereby said lever may be held within said opening.

4. In a valve of the character described, a metallic fluid container having an opening formed therein, a reinforcing ring surrounding said opening and secured to said container, a valve casing extending into said container and having a flange folded to said ring, a removable valve seat positioned in the lower end of said casing, and an outlet conduit removably secured to said ring to permit of the exterior removal of said valve seat.

In testimony whereof I affix my signature.

RICHARD H. CARR.